(12) United States Patent  
Crawford (10) Patent No.: US 8,509,395 B1
(45) Date of Patent: Aug. 13, 2013

(54) SELECTING A MESSAGE GREETING FOR AN UNAVAILABLE PARTY BASED UPON CONTEXTUAL DATA ASSOCIATED WITH A CONTACTING PARTY

(75) Inventor: Jerry Crawford, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/448,828

(22) Filed: Apr. 17, 2012

(51) Int. Cl.
*H04M 1/64* (2006.01)

(52) U.S. Cl.
USPC .. 379/76; 379/88.12; 379/88.18; 379/167.08; 455/412.2

(58) Field of Classification Search
USPC ............... 379/67.1, 76, 88.16, 88.18–88.22, 379/167.08, 263, 72, 88.12; 455/412.2; 340/7.53
See application file for complete search history.

(56) References Cited

U.S. PATENT DOCUMENTS

| | | | |
|---|---|---|---|
| 6,226,362 | B1 | 5/2001 | Gerszberg et al. |
| 6,377,664 | B2 | 4/2002 | Gerszberg et al. |
| 7,542,552 | B2 | 6/2009 | Korah et al. |
| 7,599,473 | B2 * | 10/2009 | Michael et al. ................. 379/76 |
| 7,995,719 | B2 | 8/2011 | Campbell et al. |
| 2006/0072715 | A1 | 4/2006 | Michael et al. |
| 2006/0245558 | A1 | 11/2006 | Gatzke et al. |
| 2007/0268130 | A1 | 11/2007 | Yee et al. |
| 2008/0207176 | A1 | 8/2008 | Brackbill et al. |
| 2009/0022285 | A1 | 1/2009 | Swanburg et al. |
| 2009/0190734 | A1 | 7/2009 | White et al. |
| 2010/0159890 | A1 | 6/2010 | Sigmund et al. |
| 2010/0167699 | A1 | 7/2010 | Sigmund et al. |
| 2011/0105087 | A1 | 5/2011 | Toebes et al. |

OTHER PUBLICATIONS

Oliver, Sam, "Apple's Still Working on iChat Video Answering Machine," [http://www.appleinsider.com/articles/09/04/09/apples_still_working_on_ichat_video_answering_machine.html] Apr. 9, 2009.
Siegler, MG, "FacePlant: An App to Tell You When You Can Actually Use FaceTime," [http://techcrunch.com/2010/07/22/faceplant/] Jul. 22, 2010.
Mirial, "PSE Video Answering Machine," [http://web.archive.org/web/20110714102128/http://www.mirial.com/products/PSE_Video_Answering_Machi.html] Jul. 14, 2011.

* cited by examiner

*Primary Examiner* — Md S Elahee
(74) *Attorney, Agent, or Firm* — Hartman & Citrin LLC (57) ABSTRACT

A message greeting system receives a notification that a party is unavailable in response to a communication initiated by a contacting party. In response to receiving the notification, the message greeting system acquires contextual data associated with the contacting party, determines a message greeting that is appropriate for the contacting party based upon the contextual data, acquires the appropriate message greeting, and sends the appropriate message greeting to a contacting party device associated with the contacting party. The appropriate message greeting includes a message greeting that is usable by the contacting party given a context in which the contacting party is involved as identified by the contextual data. In some embodiments, the message greeting system acquires the appropriate message greeting by adapting an inappropriate message greeting for the context in which the contacting party is involved, thereby creating the appropriate message greeting.

15 Claims, 8 Drawing Sheets

SELECTING A MESSAGE GREETING FOR AN UNAVAILABLE PARTY BASED UPON CONTEXTUAL DATA ASSOCIATED WITH A CONTACTING PARTY

TECHNICAL FIELD

The concepts and technologies disclosed herein generally relate to message services. More particularly, the concepts and technologies disclosed herein relate to selecting a message greeting for an unavailable party based upon contextual data associated with a contacting party.

BACKGROUND

Typical voicemail systems allow a user to record a custom voicemail greeting or select a predefined voicemail greeting that is to be played to a caller when the user is unavailable to answer an incoming voice call. A voicemail greeting typically provides some information, such as the name of the user and a message indicating the user's current unavailability, in audio form to the caller and prompts the caller to leave a voicemail message. Some voicemail systems are configured to change a voicemail greeting to identify the presence status of the called party. For instance, if the called party is in a meeting, the voicemail system would change the voicemail greeting to reflect that the called party is in the meeting.

With the advent of messaging services such as short message service ("SMS"), multimedia message service ("MMS"), and e-mail, people now have the ability to communicate in a variety of scenarios in which traditional voice calls would be unacceptable; for instance, when a person initiating a communication is in a meeting or is otherwise unwilling or unable to place a voice call. Conversely, these same messaging services often require the person initiating the communication to interact with a device, such as a cellular telephone, to input text via a physical or software keyboard. This diverts the person's attention from other tasks and therefore causes these messaging services to be unsuitable when a person is performing certain other tasks, such as driving. Due to the unsuitability of using messaging services while driving, legislation has been passed in several municipalities to illegalize the use of messaging services while driving.

In an effort to reduce the use of messaging services while driving, many service providers have begun to provide software applications that prevent users from accessing messaging features and others while driving. One such software application is AT&T DriveMode, available from AT&T Inc. of Dallas, Tex. ("DriveMode"). When an incoming communication such as an SMS, MMS, e-mail, or call is received by a device on which the DriveMode software application is executing, the DriveMode software application prevents any notification in the form of sound, vibration, or visual feedback so as not to distract the driver. DriveMode also causes the person initiating the communication to receive an auto reply message letting them know the driver is busy driving and will contact them at a later time.

It is with respect to these and other considerations that the disclosure made herein is presented.

SUMMARY

Concepts and technologies are disclosed herein for selecting a message greeting for an unavailable party based upon contextual data associated with a contacting party. According to one aspect disclosed herein, a message greeting system receives a notification that a party is unavailable in response to a communication initiated by a contacting party. In response to receiving the notification, the message greeting system acquires contextual data associated with the contacting party, determines a message greeting that is appropriate for the contacting party based upon the contextual data, acquires the appropriate message greeting, and sends the appropriate message greeting to a contacting party device associated with the contacting party. The appropriate message greeting includes a message greeting that is usable by the contacting party given a context in which the contacting party is involved as identified by the contextual data.

In some embodiments, the contextual data includes presence data associated with the contacting party. In some embodiments, the contextual data includes customer data associated with the contacting party. In some embodiments, the contextual data includes device data associated with the contacting party device. In some embodiments, the contextual data includes service plan data associated with the contacting party.

In some embodiments, the message greeting system acquires the appropriate message greeting by adapting an inappropriate message greeting for the context in which the contacting party is involved, thereby creating the appropriate message greeting.

In some embodiments, the message greeting system queries a message store for the appropriate message greeting. The message store is configured to store one or more message greetings associated with the unavailable party. In these embodiments, the message greeting system also determines if one of the one or more message greetings stored in the message store is the appropriate message greeting. In response to determining that one of the one or more message greetings is the appropriate message greeting, the message greeting system requests, receives the appropriate message greeting from the message store, and sends the appropriate message greeting to the contacting party device. In response to determining that one of the one or more message greetings is not the appropriate message greeting, the message greeting system requests an inappropriate message greeting of the one or more message greetings from the message store, receives the inappropriate message greeting, sends the inappropriate message greeting to an adaptation module with instructions to adapt the inappropriate message for the context in which the contacting party is involved, thereby creating the appropriate message greeting, and receives the appropriate message greeting from the adaptation module.

In some embodiments, the message greeting system queries the message store for the appropriate message greeting. In these embodiments, the message greeting system also determines if one of the one or more message greetings stored in the message store is the appropriate message greeting. In response to determining that one of the one or more message greetings is the appropriate message greeting, the message greeting system requests, receives the appropriate message greeting from the message store, and sends the appropriate message greeting to the contacting party device. In response to determining that one of the one or more message greetings is not the appropriate message greeting, the message greeting system instructs the message store to send an inappropriate message to an adaptation module and instructs the adaptation module to adapt the inappropriate message for the context in which the contacting party is involved, thereby creating the appropriate message greeting. The message greeting system then receives the appropriate message greeting from the adaptation module.

In some embodiments, the message greeting system queries the message store for the appropriate message greeting.

In response to querying the message store, the message greeting system receives a message greeting of the one or more message greetings associated with the unavailable party from the message store and determines if the message greeting is the appropriate message greeting. In response to determining that the message greeting is not the appropriate message greeting, the message greeting system sends the message greeting to an adaptation module with instructions to adapt the message greeting for the context in which the contacting party is involved, thereby creating the appropriate message greeting. The message greeting then receives the appropriate message greeting from the adaptation module. In response to determining that the message greeting is the appropriate message, the message greeting system sends the message greeting to the contacting party device.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for selecting message greetings for an unavailable party based upon contextual data associated with a contacting party will be presented.

Figure 1:
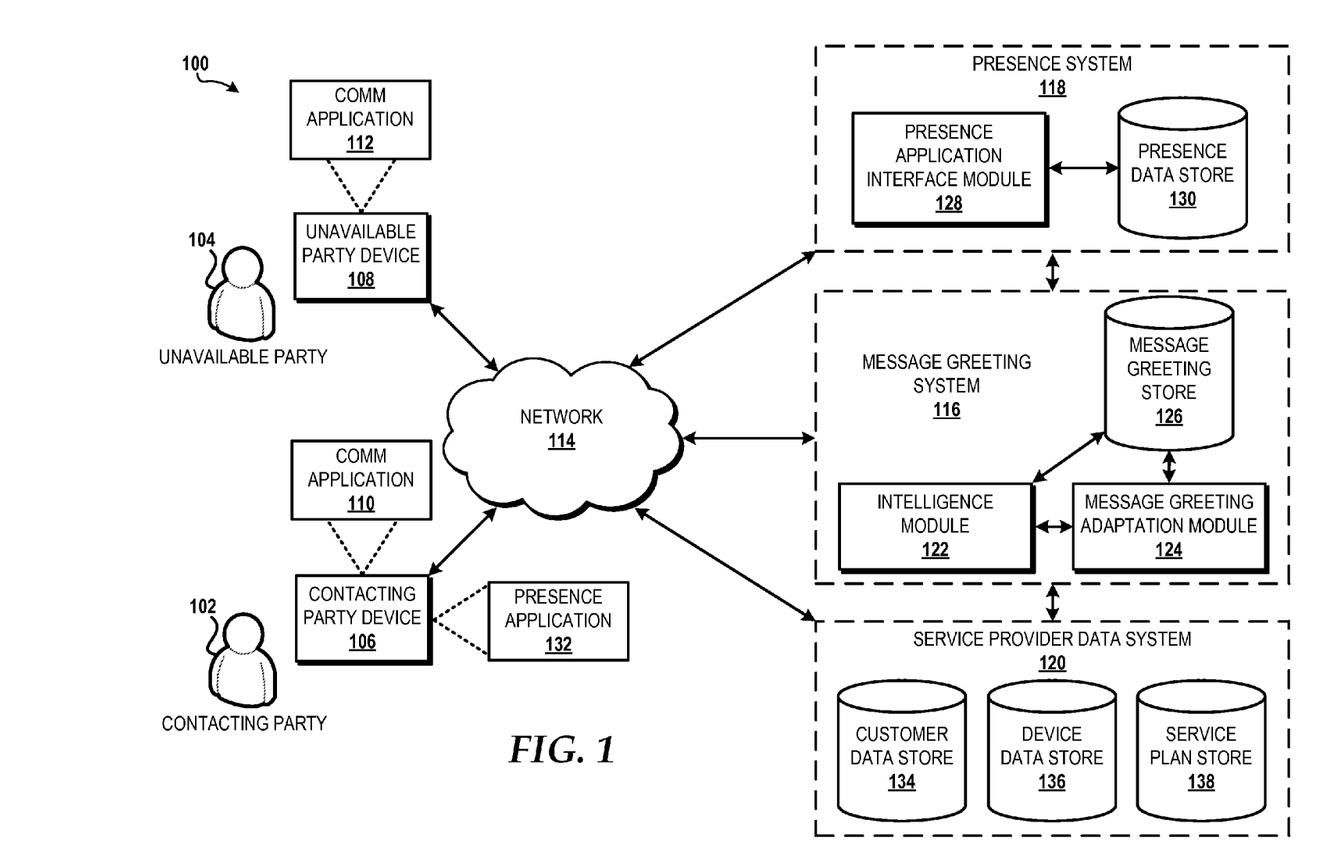
FIG. 1 is a diagram illustrating an illustrative operating environment for implementing various embodiments presented herein.

Referring now to FIG. 1, aspects of an operating environment 100 for various embodiments presented herein will be described. The illustrated operating environment 100 includes a contacting party 102 that desires to communicate with another party 104 that is currently unavailable ("unavailable party 104"). The contacting party 102 utilizes a contacting party device 106 to initiate a communication directed to an unavailable party device 108 associated with the unavailable party 104. More particularly, the contacting party 102 utilizes a contacting party device communication application 110 ("communication application 110") executing on the contacting party device 106 to initiate the communication directed to an unavailable party communication application 112 ("communication application 112") executing on an unavailable party device 108.

In some embodiments, the communication is a voice call, in which case the communication application 110 may be a voice call application configured to provide functionality to facilitate the dialing of a telephone number or the selection of a stored telephone number associated with the unavailable party device 108 to initiate a voice call directed to the unavailable party 104, and to establish, maintain, and tear down the voice call. In some embodiments, the communication is a text message, such as a short message service ("SMS") message, in which case the communication application 110 is a text message application configured to provide functionality to specify one or more text message recipients, create a text message body, edit the text message body, and send the text message to the specified text message recipients. In some embodiments, the communication is a multimedia message, such as a multimedia message service ("MMS") message, in which case the communication application 110 is a multimedia message application configured to provide functionality to specify one or more multimedia message recipients, attach one or more images, audio files, and/or video files to a multimedia message, create a text message body for the multimedia message, edit the text message body, and send the multimedia message to the specified multimedia message recipients. In some embodiments, the communication is a video call, in which case the communication application 110 is a video call application configured to facilitate the dialing of a telephone number, session initiation protocol ("SIP") address, or other identifier associated with the unavailable party device 108 to initiate a video call directed to the unavailable party 104. Other communication types such as e-mail are also contemplated.

Although the communication application 110 is shown as a single application, the communication application 110 may be representative of multiple applications, each of which is configured to facilitate one or more of the aforementioned communication types. The communication application 110 may also be configured to receive communications of the communication type(s) that it is configured to send and suitably present them to the contacting party 102 via the contacting party device 106. The communication application 112 may be configured in a similar manner as the application 110.

The contacting party device 106 and the unavailable party device 108 each may be a mobile telephone, a plain old telephone system ("POTS") telephone, a voice-over internet protocol ("VoIP") telephone, a personal computer ("PC"), a desktop workstation, a laptop computer, a tablet computer, a notebook computer, an ultraportable computer, a personal digital assistant ("PDA"), an electronic-book reader, a game console, a set-top box, a consumer electronics device, a server computer, or any other type of computing system configured to perform the various operations described herein. The contacting party device 106 and the unavailable party device 108 are each illustrated as being in communication with a network 114. Although only a single network is illustrated, it is contemplated that the contacting party device 106 and/or the unavailable party device 108 may be in communication with one or more other networks (not shown), which facilitate a connection to the network 114.

In some embodiments, the network 114 is or includes a wireless wide area network ("WWAN"), such as a mobile telecommunications network utilizing one or more mobile telecommunications technologies to provide voice and/or data services to the contacting party device 106 and/or the unavailable party device 108. The mobile telecommunications technologies include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"), or a combination thereof. Moreover, the network 114 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 114 may be configured to provide voice and/or data communications with any combination of the above technologies. The network 114 may be configured to or adapted to provide voice and/or data communications in accordance with future generation technologies.

In some embodiments, the network 114 is or includes a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points is another computing device with connectivity to a WWAN and, as such, is functioning as a WI-FI hotspot. Connections to the WLAN may be secured via various encryption technologies including, but not limited to, WI-FI Protected Access ("WPA"), WPA2, Wired Equivalent Privacy ("WEP"), and the like.

In some embodiments, the network 114 is or includes a landline communications network, an internet, the Internet, a LAN, a campus area network ("CAN"), a metropolitan network ("MAN"), a WAN, or any combination thereof. It should be understood that the network 114 may include any number of networks. For example, the network 114 may include a number of access networks that facilitate the contacting party device 106 and/or the unavailable party device 108 to access a number of core networks that provide functionality to route calls, messages, and handle data sessions.

The network 114 is illustrated as being in communication with a message greeting system 116, a presence system 118, and a service provider data system 120. The message greeting system 116 is illustrated as being in direct communication with the presence system 118 and the service provider data system 120, although in certain implementations, the message greeting system 116 may be configured to communicate with the presence system 118 and/or the service provider data system 120 only via the network 114 or via another network (not shown).

The message greeting system 116 is configured to send message greetings to the contacting party device 106 on behalf of the unavailable party 104. A message greeting notifies the contacting party 102 that the unavailable party 104 is unavailable. A message greeting may include one or more text, audio, video, image, and/or interactive components, as will be described in greater detail herein below with reference to FIG. 2. As also will be described in greater detail herein below, a message greeting is selected by the message greeting system 116 based upon contextual data associated with the contacting party 102. The contextual data, in some embodiments, includes presence data obtained from the presence system 118 and/or service provider data obtained from the service provider data system 120.

The message greeting system 116 is configured to execute a number of modules in order to provide various services described herein. In the illustrated embodiment, the message greeting system 116 is configured to execute an intelligence module 122 and a message greeting adaptation module 124 to provide various services described herein. The modules may execute on a single message greeting system 116 as in the illustrated embodiment, or in parallel across multiple message greeting systems. In addition, each module may consist of a number of subcomponents executing on different message greeting systems or other computing systems or devices within, or in communication with, the message greeting system 116. The modules may be implemented as software, hardware, or any combination thereof.

The intelligence module 122 is configured to receive an unavailable party notification from the network 114. The unavailable party notification identifies the unavailability of the unavailable party device 108, and thereby also the unavailability of the unavailable party 104. In response to receiving the unavailable party notification, the intelligence module 122 is configured to acquire contextual data associated with the contacting party 102 from the presence system 118 and/or the service provider data system 120. The intelligence module 122 also is configured to determine a message greeting that is appropriate for the contacting party 102 based upon the contextual information and acquire the appropriate message greeting.

A message greeting is a message that provides feedback to the contacting party 102 regarding the unavailability of the unavailable party 104. In some embodiments, the message greeting is a text message such as an SMS message. In some embodiments, the message greeting is a multimedia message such as an MMS message. In some embodiments, the message greeting is a voicemail greeting message. In some embodiments, the message greeting is a video message. In some embodiments, the message greeting is an audio message. In some embodiments, the message greeting is an interactive message.

The feedback provided to the contacting party 102 in a message greeting may be provided by the unavailable party 104 or a service provider from which the unavailable party 104 has a communications service that facilitates the unavailable party device 108 to communicate with the network 114 to send and/or receive communications when the unavailable party device 108 is available. It is contemplated that the feedback may be contacting party specific such that the feedback provided to one contacting party is different from the feedback provided to another contacting party.

An appropriate message greeting is a message greeting that is usable by the contacting party 102 given a context in which the contacting party 102 is involved. The context in which the contacting party 102 is involved is provided by the contextual data associated with the contacting party 102. The contextual data, as will be described in greater detail below, may be presence data, customer data associated with the contacting party 102, device data associated with the contacting party device 106, service plan data associated with the contacting party 102, or any combination thereof. The intelligence module 122 also is configured to instruct the message greeting system 116 to send the appropriate message greeting to the contacting party device 106.

The message greeting store 126 is configured to store one or more message greetings for one or more individuals, such as the unavailable party 104. In some embodiments, the message greeting store 126 is configured to store message greetings including various combinations of text, audio, video, image, and/or interactive components for use in notifying the contacting party 102 that the unavailable party 104 is unavailable. In some embodiments, the message greeting store 126 is configured to provide a message greeting that is considered to be inappropriate for the context in which the contacting party 102 is involved to the intelligence module 122 upon request. In other embodiments, the message greeting store 126 is configured to provide a message greeting that is considered to be inappropriate for the context in which the contacting party 102 is involved to the message greeting adaptation module 124 upon request for adaptation to an appropriate message greeting.

Although the message greeting system 116 is illustrated as including the message greeting store 126, the message greeting system 116 may alternatively be in communication with the message greeting store 126 positioned external to the message greeting system 116. In any case, for ease of explanation, the disclosure made herein may refer to the message greeting system 116 communicating with the message greeting store 126. This is intended to encompass communications regardless of the physical location of the message greeting store 126.

The message greeting adaptation module 124 is configured to adapt a message greeting that is considered by the intelligence module 122 to be inappropriate for the context in which the contacting party 102 is involved into a message greeting that is considered by the intelligence module 122 to be appropriate for the context in which the contacting party 102 is involved. In some embodiments, the message greeting adaptation module 124 receives instructions to adapt a message greeting from the intelligence module 122. In these embodiments, the message greeting adaptation module 124 may receive the message greeting for adaptation from the message greeting store 126 directly or via the intelligence module 122.

In some embodiments, adaptation of an inappropriate message greeting into an appropriate message greeting includes converting the inappropriate message greeting from a first format into a second format, thereby creating the appropriate message greeting. For instance, the message greeting adaptation module 124 may convert the inappropriate message greeting from a text format or a video format into an audio format; an audio format into a text format; a video format into a text format or an audio format; or an interactive format into a text format, an audio format, or a video format.

In some embodiments, the adaptation of an inappropriate message greeting into an appropriate message greeting includes extracting and discarding one or more inappropriate components of the inappropriate message greeting to isolate one or more appropriate components of the inappropriate message greeting, thereby creating an appropriate message greeting. For instance, the message greeting adaptation module 124 may take an inappropriate message greeting that includes a video component, a text component, and an audio component and extract and discard the video component and the text component based upon contextual data to create an appropriate message greeting that includes only an audio component.

In some embodiments, adaptation of an inappropriate message greeting into an appropriate message greeting includes constructing the appropriate message greeting from disparate components stored in the message greeting store 126. For instance, the message greeting adaptation module 124 may take a text component, a video component, and an audio component that are separately stored in the message greeting store 126 and combine these components to create the appropriate message greeting.

The presence system 118 is configured to execute a presence application interface module 128 to receive presence data associated with the contacting party 102, store the presence data in a presence data store 130, and provide the presence data upon request by the intelligence module 122 for use, at least in part, to determine an appropriate message greeting for the contacting party 102. In particular, the presence application interface module 128 is configured to interface with one or more presence applications, such as a presence application 132 executing on the contacting party device 106, to receive presence data associated with the contacting party 102. The presence application 132 may be an email application, an instant messaging application, a social networking application, or any other application that is configured to execute on the contacting party device 106 and that is configured to provide presence data associated with the contacting party 102.

Presence data is used herein to describe a status indicator that conveys an ability and/or willingness of an individual or entity to communicate or to receive communications. In some embodiments, the presence data is dependent upon a communication type. For instance, the presence data may indicate that the contacting party 102 is available for receiving audio but not for receiving text, that the contacting party 102 is available for receiving text but not for receiving audio or video, and so on.

The service provider data system 120 is configured to provide customer data from a customer data store 134, to provide device data from a device data store 136, and/or to provide service plan data from a service plan store 138 upon request by the intelligence module 122 for use, at least in part, in determining an appropriate message greeting for the contacting party 102. The customer data stored in the customer data store 134 may include, but is not limited to, name, physical address, e-mail address, SIP address, telephone number, customer status (e.g., pays bill on time or does not pay bill on time), customer history (e.g., length of account), customer preferences, or combinations thereof. The device data stored in the device data store 136 may include, but is not limited to, device type (e.g., feature phone, smart phone, POTS phone, VoIP phone, computer, etc.), device manufacturer, device model, device serial number, International Mobile Equipment Identity ("IMEI"), device capabilities, device software version, device hardware version, device firmware version, combinations thereof, or the like. The service plan data stored in the service plan store 138 may include details regarding a data service plan, a voice service plan, and/or a messaging service plan that the contacting party 102 has, and/or an indication of used minutes, used data, and/or used messages for a given billing period including, for example, a current billing period.

The context in which the contacting party 102 is involved may vary from time to time. For instance, as the contacting party 102 performs various tasks throughout a day, such as getting ready for work, doing household chores, getting children ready for school, tending to pets, driving to work, running errands, working out, and the like, the contacting party 102 may at any given time be in a specific context. This specific context may be repeatable over time, such as tasks performed on a daily basis, or may be a one off context or otherwise less frequent context. The concepts and technologies disclosed herein function in any case.

By way of example and not limitation, suppose the contacting party device 106 is a smartphone with device capabilities to accept and playback message greetings that include audio, text, video, images, and/or interactive components, the contacting party 102 is currently driving, the contacting party 102 has a data plan that allows the contacting party 102 to receive message greetings including any of the aforementioned components, and the contacting party 102 has used the contacting party device 106 to send a communication directed to the unavailable party device 108. In this example, the intelligence module 122 may determine that an appropriate message greeting for the contacting party 102 given the aforementioned contextual data is an audio message greeting. As a result, the intelligence module 122 may acquire an audio message greeting and send the audio message greeting to the contacting party device 108. Various embodiments of the intelligence module 122 acquiring an appropriate message are described in detail below with reference to FIGS. 3A-3D.

Figure 2:
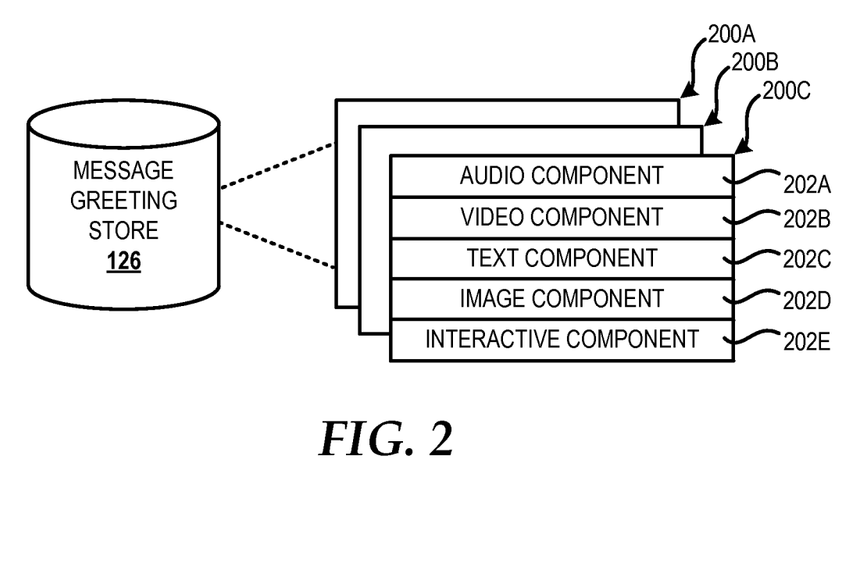
FIG. 2 is a data structure diagram showing aspects of one illustrative message data store utilized in various embodiments disclosed herein.

Turning now to FIG. 2, a data structure diagram showing aspects of one illustrative message greeting store 126 utilized in various embodiments presented herein. As discussed briefly above, the message greeting system 116 maintains the message greeting store 126 that stores one or more message greetings for the unavailable party 104.

The message greeting store 126 shown in FIG. 2 includes a message greeting 200 for each message greeting available for the unavailable party 104. For example, the message greeting 200A may be a first available message greeting for the unavailable party 104, the message greeting 200B may be a second available message greeting for the unavailable party 104, and the message greeting 200C may be a third available message greeting for the unavailable party 104. Although only three message greetings 200 have been illustrated in FIG. 2, it should be appreciated that the message greeting store 126, in some embodiments, is configured to store more or fewer message greetings for the unavailable party 104. Additionally, it should be appreciated that the structure of the message greeting store 126 has been greatly simplified in FIG. 2 and that the message greeting store 126 might be constructed in different ways and include many more elements than shown in FIG. 2.

Each of the illustrated message greetings 200 includes a number of fields 202, which store information for the corresponding message greeting. For instance, in the example shown in FIG. 2, the field 202A stores an audio component, the field 202B stores a video component, the field 202C stores a text component, the field 202D stores an image component, and the field 202E stores an interactive component.

An audio component provides audio associated with a message greeting. The audio component may include audio formatted in any audio format that is compatible with the contacting party device 106 so that the contacting party device 106 can playback the audio component to the contacting party 102. In some embodiments, the audio component is created based upon a conversion of a text component to the audio component via text-to-audio conversion performed by the message greeting adaptation module 124. In some embodiments, the audio component is extracted from a video that also includes audio. In some embodiments, the audio component is sourced from a voicemail greeting associated with a voicemail box of the unavailable party 104.

A video component provides video associated with a message greeting. The video component may include video formatted in any video format that is compatible with the contacting party device 106 so that the contacting party device 106 can playback the video component to the contacting party 102. In some embodiments, the video component is associated with an audio component. In some embodiments, the video component is sourced from a video message greeting associated with a video mailbox of the unavailable party 104.

A text component provides text associated with a message greeting. The text component may include text in any language, such as a language understood by the contacting party 102. In some embodiments, the text component includes letters, numbers, characters, punctuation, and/or emoticons for a text message portion of the message greeting. In some embodiments, the text component is created based upon a conversion of an audio component to the text component via an audio-to-text conversion performed by the message greeting adaptation module 124.

An image component provides an image associated with a message greeting. The image component may include an image formatted in any image format that is compatible with the contacting party device 106 so that the contacting party device 106 can present the image component to the contacting party 102. The image component may include any image selected by or for the unavailable party 104.

An interactive component provides interactive functionality for a message greeting. In some embodiments, the interactive functionality provides a graphical user interface ("GUI") through which the contacting party 102 can manipulate playback of audio and/or video components contained within the message greeting. In some embodiments, the interactive component provides a Web page, a portion thereof, or a link thereto. In some embodiments, the interactive component is a software application. In some embodiments, the interactive component is a video game.

It should be understood that a given message greeting has at least one of the aforementioned components to convey to the contacting party 102 the unavailability of the unavailable party 104. The type(s) of components available for inclusion in a given message greeting is dictated by the type of message greeting. For instance, an SMS text message greeting would only include a text component, whereas an MMS message may include a text component in addition to a video component, an image component, and/or an interactive component. Similarly, a video message greeting would include a video component and also may include an audio component.

FIGS. 3A-3D are flow diagrams showing aspects of a method 300 for selecting an appropriate message greeting for the contacting party 102 based upon contextual data associated with the contacting party 102, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 3A:
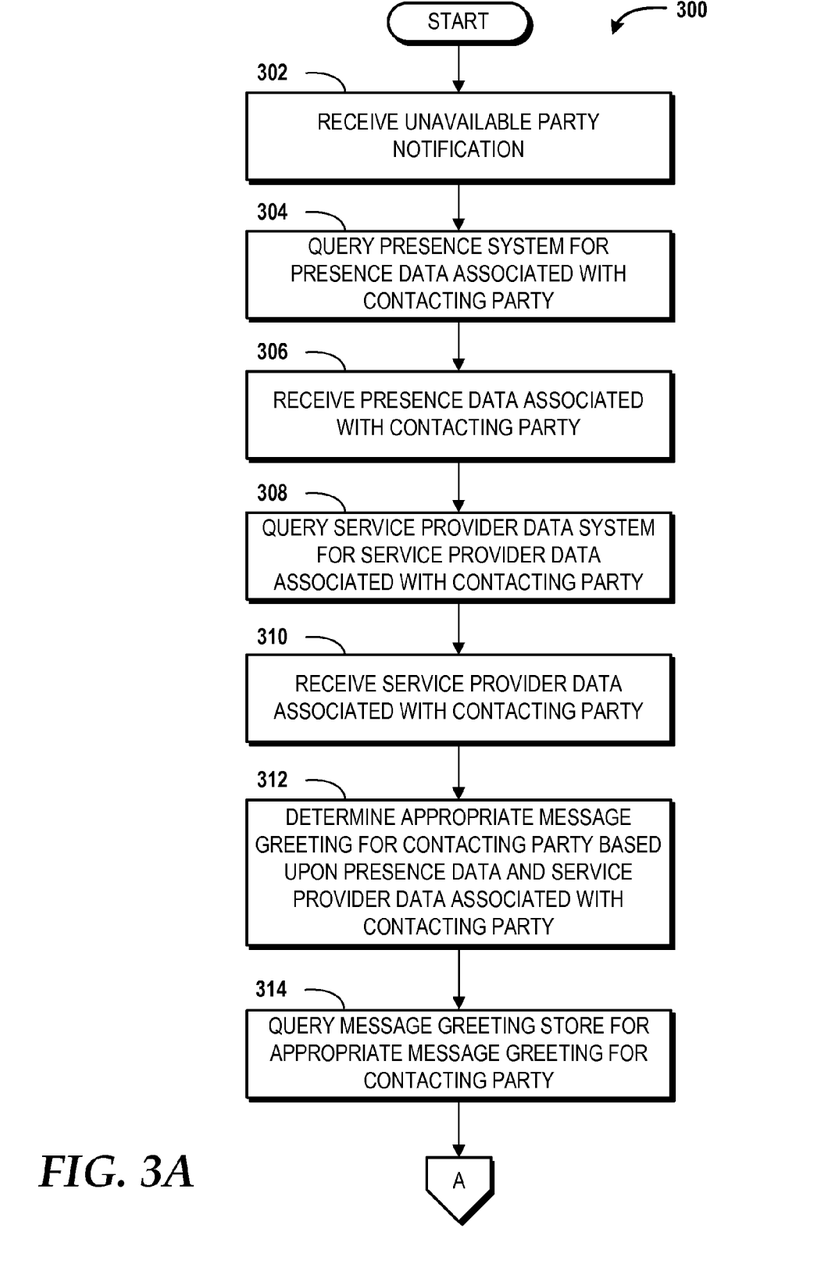
FIGS. 3A-3D are flow diagrams showing aspects of a method for selecting an appropriate message greeting for an unavailable party based upon contextual data associated with the contacting party, according to an illustrative embodiment.

The method 300 begins and proceeds to operation 302, wherein the intelligence module 122 of the message greeting system 116 receives an unavailable party notification indicating that the unavailable party device 108 is unavailable to receive a communication from the contacting party device 106. From operation 302, the method 300 proceeds to operation 304, wherein the intelligence module 122 queries the presence system 118 for presence data associated with the contacting party 102. At operation 306, the intelligence module 122 receives presence data associated with the contacting party 102 from the presence system 118. From operation 306, the method 300 proceeds to operation 308, wherein the intelligence module 122 queries the service provider data system 120 for service provider data, such as customer data, device data, and/or service plan data, associated with the contacting party 102. At operation 310, the intelligence module 122 receives service provider data associated with the contacting party 102.

From operation 310, the method 300 proceeds to operation 312, wherein the intelligence module 122 determines an appropriate message greeting for the contacting party 102 based upon the presence data and/or the service provider data associated with the contacting party 102 that was obtained in operations 306 and 310, respectively. It should be understood, however, that the determination at operation 312 may be based upon contextual data that includes presence data only or service provider data only. From operation 312, the method 300 proceeds to operation 314, wherein the intelligence module 122 queries the message greeting store 126 for the appropriate message greeting for the contacting party 102 as determined at operation 312. The method 300 now proceeds to FIG. 3B, FIG. 3C, or FIG. 3D. Each of these figures illustrates an embodiment of the method 300 for acquiring the appropriate message greeting for the contacting party 102.

Figure 3B:
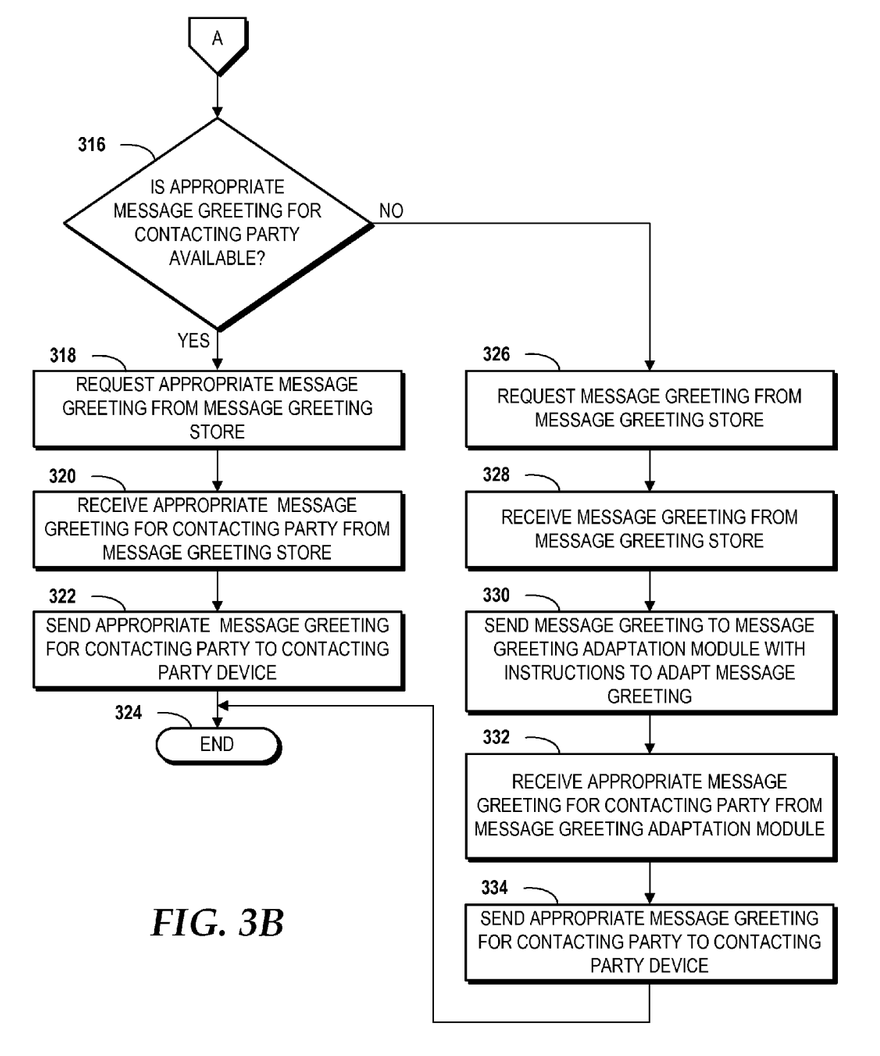

Turning first to FIG. 3B, the method 300 proceeds from operation 314 of FIG. 3A to operation 316, wherein the intelligence module 122 determines if the appropriate message greeting for the contacting party 102 is available. In some embodiments, the query at operation 314 identifies one or more components of a message greeting that would be appropriate for the contacting party 102 based upon a context in which the contacting party 102 is involved as determined based upon the presence data and/or the service provider data obtained, respectively, from the presence system 118 and the service provider data system 120. As such, the determination at operation 316 may include receiving an indication from the message greeting store 126 that the appropriate message greeting is or is not available.

If the appropriate message greeting is available, the method 300 proceeds to operation 318, wherein the intelligence module 122 requests the appropriate message greeting from the message greeting store 126. From operation 318, the method 300 proceeds to operation 320, wherein the intelligence module 122 receives the appropriate message greeting from the message greeting store 126. The method 300 then proceeds to operation 322, wherein the intelligence module 122 sends the appropriate message greeting to the contacting party device 106. From operation 322, the method 300 proceeds to operation 324, wherein the method 300 ends.

If the appropriate message greeting is not available, the method 300 proceeds to operation 326, wherein the intelligence module 122 requests a message greeting from the message greeting store 126. In some embodiments, the message greeting system 116 requests a message greeting that includes at least one or more specific components. For instance, the message greeting system 116 may request a message greeting that has at least a text component. In some embodiments, the message greeting system 116 requests any available message greeting. In some embodiments, the message greeting store 126 includes multiple messages for the unavailable party 104, one of which is designated a default message greeting. In these embodiments, the message greeting store 126 may respond to the request received from the message greeting system 116 with the default message greeting.

From operation 326, the method 300 proceeds to operation 328, wherein the intelligence module 122 receives a message greeting from the message greeting store 126. This message greeting is considered by the intelligence module 122 to be an inappropriate message greeting for the contacting party 102. From operation 328, the method 300 proceeds to operation 330, wherein the intelligence module 122 sends the inappropriate message greeting to the message greeting adaptation module 124 with instructions to adapt the message greeting to an appropriate message greeting for the context in which the contacting party 102 is involved. The intelligence module 122 then receives the appropriate message greeting from the message greeting adaptation module 124 at operation 332. The method 300 then proceeds to operation 334, wherein the intelligence module 122 sends the appropriate message greeting to the contacting party device 106. From operation 334, the method 300 proceeds to operation 324, wherein the method 300 ends.

Figure 3C:
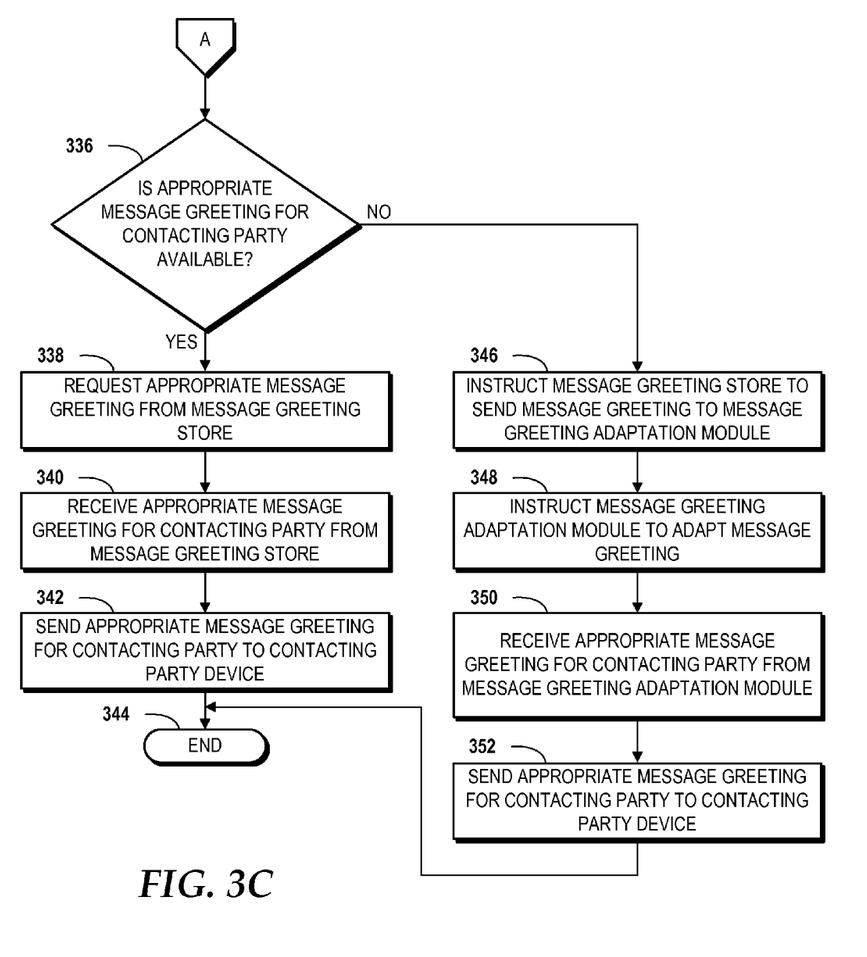

Turning now to FIG. 3C, the method 300 proceeds from operation 314 of FIG. 3A to operation 336, wherein the intelligence module 122 determines if the appropriate message greeting for the contacting party 102 is available. In some embodiments, the query at operation 314 identifies one or more components of a message greeting that would be appropriate for the contacting party 102 based upon a context in which the contacting party 102 is involved as determined based upon the presence data and/or the service provider data obtained, respectively, from the presence system 118 and/or the service provider data system 120. As such, the determination at operation 336 includes receiving an indication from the message greeting store 126 that the appropriate message greeting is or is not available.

If the appropriate message greeting is available, the method 300 proceeds to operation 338, wherein the intelligence module 122 requests the appropriate message greeting from the message greeting store 126. From operation 338, the method 300 proceeds to operation 340, wherein the intelligence module 122 receives the appropriate message greeting from the message greeting store 126. The method 300 then proceeds to operation 342, wherein the intelligence module 122 sends the appropriate message greeting to the contacting party device 106. From operation 342, the method 300 proceeds to operation 344, wherein the method 300 ends.

If the appropriate message greeting is not available, the method 300 proceeds to operation 346, wherein the intelligence module 122 instructs the message greeting store 126 to send a message greeting to the message greeting adaptation module 124. In some embodiments, the message greeting system 116 instructs the message greeting store 126 to send a message greeting to the message greeting adaptation module 124 that includes at least one or more specific components. For instance, the message greeting system 116 may instruct the message greeting store 126 to send a message greeting that has at least a text component. In some embodiments, the message greeting system 116 instructs the message greeting store 126 to send any available message greeting to the message greeting adaptation module 124. In some embodiments, the message greeting store 126 includes multiple messages for the unavailable party 104, one of which is designated a default message greeting. In these embodiments, the message greeting store 126 may respond to the instructions received from the message greeting system 116 by sending the default message greeting to the message greeting adaptation module 124.

From operation 346, the method 300 proceeds to operation 348, wherein the intelligence module 122 instructs the message greeting adaptation module 124 to adapt the message greeting to an appropriate message greeting for the context in which the contacting party 102 is involved. From operation 348, the method 300 proceeds to operation 350, wherein the intelligence module 122 receives the appropriate message greeting from the message greeting adaptation module 124. The method 300 then proceeds to operation 352, wherein the intelligence module 122 sends the appropriate message greeting to the contacting party device 106. From operation 352, the method 300 proceeds to operation 344, wherein the method 300 ends.

Figure 3D:
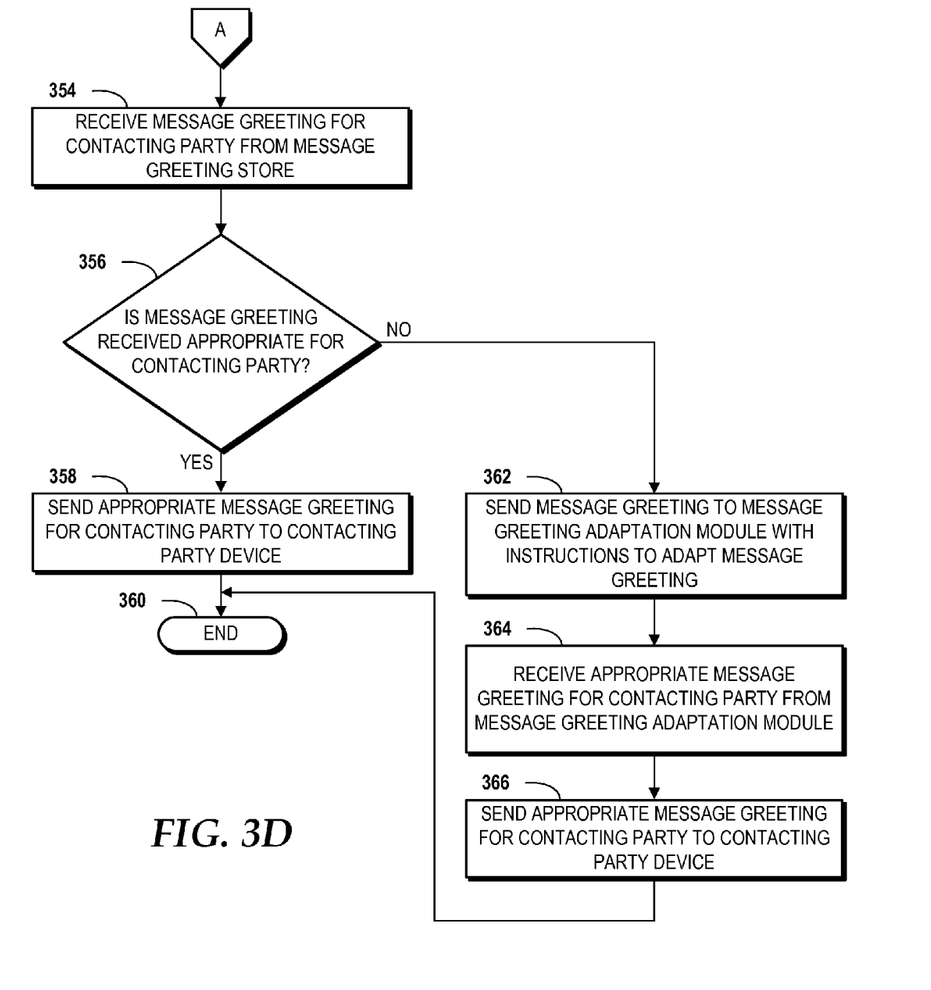

Turning now to FIG. 3D, the method 300 proceeds from operation 314 of FIG. 3A to operation 354, wherein the intelligence module 122 receives a message greeting from the message greeting store 126 in response to the query at operation 314. From operation 354, the method 300 proceeds to operation 356, wherein the intelligence module 122 determines if the message greeting received from the message greeting store 126 is appropriate for the contacting party 102.

If, at operation 356, the intelligence module 122 determines that the message greeting received from the message greeting store 126 is appropriate for the contacting party 102, the method 300 proceeds to operation 358. At operation 358, the message greeting system 116 sends the appropriate message greeting to the contacting party device 106. From operation 358, the method 300 proceeds to operation 360, wherein the method 300 ends.

If, at operation 356, the intelligence module 122 determines that the message greeting received from the message greeting store 126 is not appropriate for the contacting party 102, the method 300 proceeds to operation 362. At operation 362, the intelligence module 122 sends the message greeting to the message greeting adaptation module 124 with instructions to adapt the message greeting to an appropriate message greeting for the context in which the contacting party 102 is involved. From operation 362, the method 300 proceeds to operation 364, wherein the intelligence module 122 receives the appropriate message greeting from the message greeting adaptation module 124. The method 300 then proceeds to operation 366, wherein the message greeting system 116 sends the appropriate message greeting to the contacting party device 106. From operation 366, the method 300 proceeds to operation 360, wherein the method 300 ends.

Figure 4:
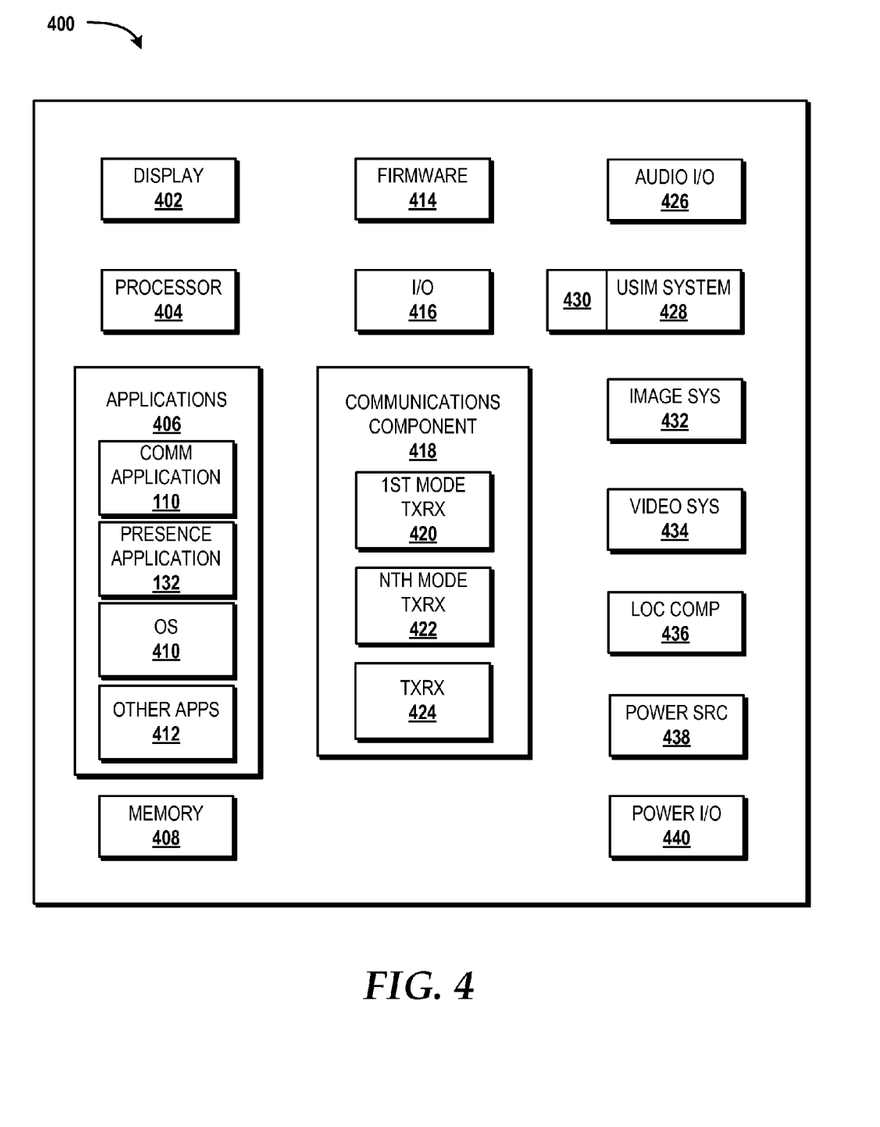
FIG. 4 is a mobile device architecture diagram illustrating an illustrative mobile device hardware and software architecture for a mobile device capable of implementing aspects of the embodiments disclosed herein.

Turning now to FIG. 4, an illustrative mobile device 400 and components thereof will be described. Although connections are not shown between the components illustrated in FIG. 4, the components can interact with each other to carry out device functions. In some embodiments, for example, the components are arranged so as to communicate via one or more busses (not shown). It should be understood that FIG. 4 and the following description are intended to provide a general understanding of a suitable environment in which various aspects of embodiments can be implemented. The contacting party device 106 and/or the unavailable party device 108 described herein above may be configured like the mobile device 400. It should be understood that the mobile device may include additional functionality or include less functionality than now described.

As illustrated in FIG. 4, the mobile device 400 includes a display 402 for visually displaying data including, but not limited to, GUI elements, text, images, video, virtual keypads and/or keyboards, messaging data, notification messages, metadata, internet content, device status, time, date, calendar data, device preferences, map and location data, and the like. The mobile device 400 also includes a processor 404 for processing data and/or executing computer-executable instructions of one or more applications 406 stored in a memory 408.

In the illustrated embodiment, the applications 406 include the communication application 110, the presence application 132, an operating system ("OS") application 410, and other applications 412. In some embodiments, the OS application 410 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

In some embodiments, the other applications 412 include, for example, visual voicemail applications, messaging applications, text-to-speech and speech-to-text applications, add-ons, plug-ins, email applications, music applications, video applications, camera applications, location-based service applications, navigation applications, power conservation applications, game applications, productivity applications, entertainment applications, enterprise applications, combinations thereof, and the like. The applications 406 or portions thereof are stored in the memory 408 and/or in a firmware 414, and are executed by the processor 404. The firmware 414 may also store code for execution during device power up and power down operations. In some embodiments, the OS 410 or a portion thereof, such as a kernel, is stored in the firmware 414.

The mobile device 400 also includes an input/output ("I/O") interface 416 for the input/output of data such as location information, presence status information, user IDs, passwords, application initiation (start-up) requests, and other input/output of data associated with the embodiments disclosed herein. In some embodiments, the I/O interface 416 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 400 is configured to synchronize with another device (e.g., a computer) to transfer content stored to/from the mobile device 400. In some embodiments, the mobile device 400 is configured to receive updates to one or more of the applications 406 via the I/O interface 416. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device instead of, or in addition to, a communications component 418.

The communications component 418 interfaces with the processor 404 to facilitate wireless communications with one or more networks. In some embodiments, the one or more networks include networks that utilize a mobile wireless technology. In some embodiments, one or more networks include networks that utilize non-cellular wireless technologies such as WI-FI or WIMAX. In some embodiments, the communications component 418 includes a multimode communications subsystem for facilitating communications via a cellular network and one or more WI-FI, WIMAX or other non-cellular wireless network.

The communications component 418, in some embodiments, includes one or more transceivers each configured to communicate over the same or a different wireless technology standard. For example, the transceivers of the communications component 418 may be configured to communicate using GSM, CDMAONE, CDMA2000, LTE, and various other 2G, 2.5G, 3G, 4G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like. In addition, the communications component 418 may facilitate data communications using GPRS, EDGE, the HSPA protocol family including HSDPA, EUL or otherwise termed HSUPA, HSPA+, and various other current and future wireless data access standards.

In the illustrated embodiment, the communications component 418 includes a first cellular transceiver 420 that operates in one mode (e.g., GSM), and an $N^{th}$ cellular transceiver 422 operates in a different mode (e.g., UMTS). While only two cellular transceivers 420, 422 are illustrated, it should be appreciated that more than two transceivers can be included in the communications component 418.

The illustrated communications component 418 also includes an alternative communications transceiver 424 for use by other communications technologies including WI-FI, WIMAX, BLUETOOTH, infrared, infrared data association ("IRDA"), near field communications ("NFC"), other RF, combinations thereof, and the like. In some embodiments, the communications component 418 also facilitates reception from terrestrial radio networks, digital satellite radio networks, internet-based radio service networks, combinations thereof, and the like.

The communications component 418 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 400 may be provided by an audio I/O component 426 that includes a speaker for the output of audio signals and a microphone to collect audio signals.

The illustrated mobile device 400 also includes a universal subscriber identity module ("USIM") system 428 that includes a SIM slot interface 430 for accommodating a USIM card. In some embodiments, the USIM system 428 is configured to accept insertion of other SIM cards for access to other network types such as GSM. In other embodiments, the USIM system 428 is configured to accept multiple SIM cards. In still other embodiments, the USIM system 428 is configured to accept a universal integrated circuit card ("UICC") with one or more SIM applications stored thereupon.

The mobile device 400 may also include an image capture and processing system 432 ("image system"). Photos may be obtained via an associated image capture subsystem of the image system 432, for example, a camera. The mobile device 400 may also include a video system 434 for capturing, processing, recording, and/or modifying video content. Photos and videos obtained using the image system 432 and the video system 434, respectively, may be added as message content to a MMS message and sent to another mobile device.

The illustrated mobile device 400 also includes a location component 436 for sending and/or receiving signals such as global positioning system ("GPS") data, assisted-GPS data, WI-FI/WIMAX and/or cellular network triangulation data, combinations thereof, and the like, for determining a location of the mobile device 400. The location component 436 may communicate with the communications component 418 to retrieve triangulation data for determining a location of the mobile device 400. In some embodiments, the location component 436 interfaces with cellular network nodes, telephone lines, satellites, location transmitters and/or beacons, wireless network transmitters and receivers, combinations thereof, and the like. In some embodiments, the location component 436 includes one or more sensors such as a compass, an accelerometer, and/or a gyroscope to determine the orientation of the mobile device 400. Using the location component 436, the mobile device 400 can generate and/or receive data to identify its location, or transmit data used by other devices to determine the location of the mobile device 400. The location component 436 may include multiple components for determining the location and/or orientation of the mobile device 400.

The illustrated mobile device 400 also includes a power source 438, such as one or more batteries and/or other power subsystem (AC or DC). The power source 438 may interface with an external power system or charging equipment via a power I/O component 440.

Figure 5:
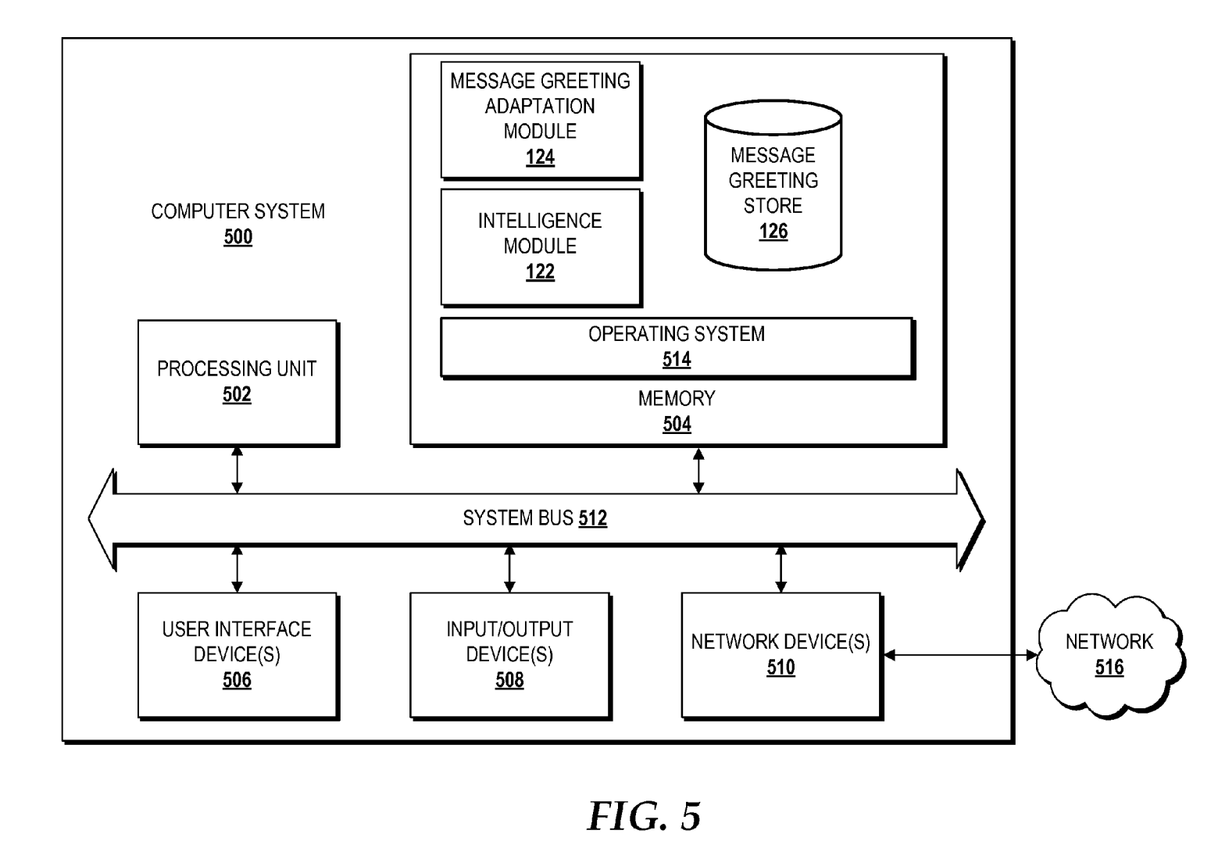
FIG. 5 is a computer architecture diagram illustrating an illustrative computer hardware and software architecture for a computing system capable of implementing aspects of the embodiments presented herein.

FIG. 5 is a block diagram illustrating a computer system 500 configured to perform various operations disclosed herein. The message greeting system 116 may be configured like the computer system 500.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514, the intelligence module 122, the message greeting adaptation module 124, and the message greeting store 126.

The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 506 may include one or more devices with which a user accesses the computer system 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 516, such as the network 114 described herein above. Examples of the network devices 510 include, but are not limited to, a modem, a radio frequency ("RF") or infrared ("IR") transceiver, a telephonic interface, a bridge, a router, or a network card. The network 516 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 516 may be a wired network such as, but not limited to, a WAN) such as the Internet, a LAN such as the Ethernet, a wired personal area network ("PAN"), or a wired metropolitan area network ("MAN").

The network 516 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 516. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the MD 800. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for selecting a message greeting for an unavailable party based upon contextual data associated with a contacting party have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A method for selecting an appropriate message greeting, the method comprising:
   receiving, using a message greeting system comprising a processor, a notification that a party is unavailable in response to a communication initiated by a contacting party;
   in response to receiving the notification, acquiring, using the message greeting system, contextual data associated with the contacting party;
   determining, using the message greeting system, an appropriate message greeting for the contacting party based upon the contextual data, wherein the appropriate message greeting is useable by the contacting party given a context in which the contacting party is involved;
   acquiring, using the message greeting system, the appropriate message greeting for the contacting party by performing operations comprising
      querying, using the message greeting system, a message store to determine if the appropriate message greeting is stored in the message store, wherein the message store stores one or more message greetings associated with the unavailable party,
      if the message greeting system determines that one of the one or more message greetings stored in the message store is the appropriate message greeting,
         requesting, using the message greeting system, the appropriate message greeting from the message store, and
         receiving, using the message greeting system, the appropriate message greeting, and
      if the message greeting system determines that one of the one or more message greetings is not the appropriate message greeting, causing, using the message greeting system, an inappropriate message stored in the message store to be adapted from a first format to a second format, by an adaptation module, for the context in which the contacting party is involved, based upon the contextual data, to create the appropriate message greeting.

2. The method of claim 1, wherein acquiring, using the message greeting system, the contextual data associated with the contacting party comprises acquiring, using the message greeting system, presence data associated with the contacting party from a presence system.

3. The method of claim 2, wherein acquiring, using the message greeting, the contextual data associated with the contacting party further comprises acquiring, using the message greeting system, service provider data associated with the contacting party from a service provider data system, the service provider data comprising at least one of:
   customer data associated with the contacting party;
   device data associated with the contacting party device; or
   service plan data associated with the contacting party.

4. The method of claim 1, further comprising sending, using the message greeting system, the appropriate message greeting for the contacting party to a contacting party device associated with the contacting party.

5. The method of claim 1, wherein
   causing, using the message greeting system, the inappropriate message stored in the message store to be adapted, by the adaption module, for the context in which the contacting party is involved, based upon the contextual data, to create the appropriate message greeting comprises
      requesting, using the message greeting system, the inappropriate message from the message store;
      receiving, using the message greeting system, the inappropriate message greeting from the message store; and
      sending, using the message greeting system, the inappropriate message greeting to the adaptation module with instructions to adapt the inappropriate message for the context in which the contacting party is involved, based upon the contextual data, to create the appropriate message greeting; and
   further comprising receiving, using the message greeting system, the appropriate message greeting from the adaptation module.

6. The method of claim 1, wherein
   causing, using the message greeting system, the inappropriate message stored in the message store to be adapted, by the adaption module, for the context in which the contacting party is involved, based up on the contextual data, to create the appropriate message greeting comprises
      instructing, using the message greeting system, the message store to send the inappropriate message to the adaptation module; and
      instructing, using the message greeting system, the adaptation module to adapt the inappropriate message for the context in which the contacting party is involved, based upon the contextual data, to create the appropriate message greeting; and further comprising receiving, using the message greeting system, the appropriate message greeting from the adaptation module.

7. A computer-readable storage medium having computer-executable instructions stored thereupon that, when executed by a computer, cause the computer to perform operations comprising:
receiving a notification that a party is unavailable in response to a communication initiated by a contacting party;
in response to receiving the notification, acquiring contextual data associated with the contacting party;
determining an appropriate message greeting for the contacting party based upon the contextual data, the appropriate message greeting being a message greeting that is usable by the contacting party given a context in which the contacting party is involved as identified by the contextual data;
determining that the appropriate message greeting currently does not exist for the contacting party;
adapting a message greeting from a first format that is inappropriate for the context in which the contacting party is involved to a second format that is appropriate for the context in which the contacting party is involved so as to create the appropriate message greeting; and
sending the appropriate message greeting for the contacting party to a contacting party device associated with the contacting party, the appropriate message greeting notifying the contacting party that the party is unavailable.

8. The computer-readable storage medium of claim 7, wherein the first format is a text format or a video format and the second format is an audio format.

9. The computer-readable storage medium of claim 7, wherein the first format is an audio format or video format and the second format is a text format.

10. The computer-readable storage medium of claim 7, wherein the first format is a video format and the second format is a text format or an audio format.

11. The computer-readable storage medium of claim 7, wherein the first format is an interactive format and the second format is a text format, an audio format, or a video format.

12. The computer-readable storage medium of claim 7, wherein the contextual data comprises at least one of:
presence data associated with the contacting party;
customer data associated with the contacting party;
device data associated with the contacting party device; or
service plan data associated with a service plan associated with the contacting party.

13. A message greeting system comprising:
a processor; and
a memory having processor-executable instructions stored thereupon that, when executed by the processor, cause the processor to perform operations comprising
receiving a notification that a party is unavailable in response to a communication initiated by a contacting party,
querying a presence system for presence data associated with the contacting party,
receiving the presence data associated with the contacting party from the presence system,
determining an appropriate message greeting for the contacting party based upon the presence data,
determining if the appropriate message greeting is stored in a message store,
if the appropriate message greeting is stored in the message store, acquiring the appropriate message greeting for the contacting party from the message store,
if the appropriate message greeting is not stored in the message store, adapting a message greeting stored in the message store from a first format that is inappropriate for a context in which the contacting party is involved to a second format that is appropriate for the context, based at least in part upon the presence data, thereby creating the appropriate message greeting, and
sending the appropriate message greeting to a contacting party device associated with the contacting party, the appropriate message greeting notifying the contacting party that the party is unavailable.

14. The message greeting system of claim 13, wherein the instructions, when executed by the processor, cause the processor to perform further operations comprising:
querying a service provider data system for service provider data associated with the contacting party; and
receiving the service provider data associated with the service provider data system from the service provider data system; and
wherein determining the appropriate message greeting for the contacting party based upon the presence data comprises determining the appropriate message greeting for the contacting party further based upon the service provider data.

15. The message greeting system of claim 14, wherein the service provider data comprises at least one of:
customer data associated with the contacting party;
device data associated with the contacting party device; or
service plan data associated with the contacting party.

* * * * *